US011669322B2

(12) United States Patent
Nolan et al.

(10) Patent No.: US 11,669,322 B2
(45) Date of Patent: Jun. 6, 2023

(54) FIRMWARE UPGRADE METHOD AND APPARATUS

(71) Applicant: Intel Corporation, Santa Clara, CA (US)

(72) Inventors: Michael Nolan, Maynooth (IE); Keith Nolan, Mullingar (IE); Pat Cheevers, Dublin (IE); Jurijs Kacs, Duisburg (DE); Wael Guibene, Leixlip (IE); Charlie Sheridan, Ballivor (IE); Cliodhna Ni Scanaill, Broadford (IE); Mark Kelly, Dublin (IE)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 17/119,657

(22) Filed: Dec. 11, 2020

(65) Prior Publication Data

US 2021/0279049 A1      Sep. 9, 2021

Related U.S. Application Data

(63) Continuation of application No. 15/857,151, filed on Dec. 28, 2017, now Pat. No. 10,866,798.

(51) Int. Cl.
| | |
|---|---|
| *H04L 9/32* | (2006.01) |
| *H04L 29/06* | (2006.01) |
| *G06F 9/455* | (2018.01) |
| *G06F 9/445* | (2018.01) |
| *G06F 8/65* | (2018.01) |
| *G06F 8/61* | (2018.01) |
| *G06F 8/71* | (2018.01) |
| *G06F 8/654* | (2018.01) |

(52) U.S. Cl.
CPC .............. *G06F 8/65* (2013.01); *G06F 8/64* (2013.01); *G06F 8/654* (2018.02); *G06F 8/71* (2013.01)

(58) Field of Classification Search
CPC ... G06F 8/65; G06F 8/654; G06F 8/64; G06F 8/71
See application file for complete search history.

(56) References Cited

U.S. PATENT DOCUMENTS

| | | | |
|---|---|---|---|
| 6,055,632 A | 4/2000 | Deegan et al. | |
| 9,846,472 B2 | 12/2017 | Chung et al. | |
| 9,952,645 B2 | 4/2018 | Chung et al. | |
| 10,007,507 B2 | 6/2018 | Huang | |
| 10,206,114 B2* | 2/2019 | Choi | H04W 12/35 |
| 10,866,798 B2 | 12/2020 | Nolan et al. | |
| 2003/0135705 A1 | 7/2003 | Montero | |
| 2005/0132351 A1* | 6/2005 | Randall | G06F 11/1433 |
| | | | 717/168 |
| 2006/0015861 A1 | 1/2006 | Takata et al. | |

(Continued)

OTHER PUBLICATIONS

Choi et al., Secure firmware validation and update for consumer devices in home networking, 6 pages (Year: 2016).*

(Continued)

*Primary Examiner* — Thuy Dao
(74) *Attorney, Agent, or Firm* — Schwegman Lundberg & Woessner, P.A.

(57) ABSTRACT

A method and apparatus are disclosed for performing authenticated firmware updates of a fog or IoT device, which happens concurrent with a field update of a component coupled to the device, such as a battery.

23 Claims, 13 Drawing Sheets

(56) References Cited

U.S. PATENT DOCUMENTS

| | | | |
|---|---|---|---|
| 2007/0067614 A1 | 3/2007 | Berry et al. | |
| 2007/0282478 A1 | 12/2007 | Al-ali et al. | |
| 2010/0213891 A1* | 8/2010 | Nishikawa | H02J 7/02 |
| | | | 320/106 |
| 2010/0235822 A1* | 9/2010 | Jamerson | H01M 10/4257 |
| | | | 429/163 |
| 2011/0305336 A1 | 12/2011 | Manaka | |
| 2012/0303940 A1 | 11/2012 | Grice et al. | |
| 2014/0201562 A1 | 7/2014 | Breakstone et al. | |
| 2016/0134660 A1* | 5/2016 | Ponsini | H04L 63/20 |
| | | | 726/1 |
| 2016/0306622 A1 | 10/2016 | Kim | |
| 2018/0039795 A1 | 2/2018 | Gulati | |
| 2018/0081666 A1 | 3/2018 | Surdu | |
| 2018/0176080 A1 | 6/2018 | Marsh | |
| 2019/0042228 A1 | 2/2019 | Nolan et al. | |

OTHER PUBLICATIONS

"U.S. Appl. No. 15/857,151, Notice of Allowance dated Aug. 11, 2020", 9 pgs.

"U.S. Appl. No. 15/857,151, Non Final Office Action dated Dec. 20, 2018", 15 pgs.

"U.S. Appl. No. 15/857,151, Response filed Mar. 20, 2019 to Non Final Office Action dated Dec. 20, 2018", 24 pgs.

"U.S. Appl. No. 15/857,151, Final Office Action dated May 8, 2019", 17 pgs.

"U.S. Appl. No. 15/857,151, Response filed Oct. 8, 2019 to Final Office Action dated May 8, 2019", 35 pgs.

"U.S. Appl. No. 15/857,151, Examiner Interview Summary dated Oct. 11, 2019", 3 pgs.

"U.S. Appl. No. 15/857,151, Non Final Office Action dated Nov. 26, 2019", 14 pgs.

"U.S. Appl. No. 15/857,151, Response filed Feb. 26, 2020 to Non Final Office Action dated Nov. 26, 2019", 26 pgs.

"U.S. Appl. No. 15/857,151, Final Office Action dated Apr. 17, 2020", 16 pgs.

"U.S. Appl. No. 15/857,151, Response filed Jul. 16, 2020 to Final Office Action dated Apr. 17, 2020", 24 pgs.

"U.S. Appl. No. 15/857,151, Examiner Interview Summary dated Jul. 2, 2020", 3 pgs.

Probstl, "Smart2: Smart Charging for Smart Phones", (2015), 10 pgs.

* cited by examiner

202

204

206

800

900

FIRMWARE UPGRADE METHOD AND APPARATUS

PRIORITY APPLICATION

This application is a continuation of U.S. application Ser. No. 15/857,151, filed Dec. 28, 2017, which is incorporated herein by reference in its entirety.

TECHNICAL FIELD

The present techniques relate generally to Internet of Things (IoT) and fog devices. More specifically the present techniques relate to IoT or fog devices that are to be field upgraded.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

Clusters of IoT devices may be equipped to communicate with other IoT devices as well as with a cloud computing network. This may allow the IoT devices to form an ad-hoc network between the devices, allowing them to function as a single device, also known herein as a fog device.

Performing firmware/software updates to these IoT and fog devices can be a challenge. Over-the-air (OTA) software/firmware updates are possible when there is a high-bandwidth and reliable network. However, the fog ecosystem exists, in part, to support embedded devices and wearables, some of which rely on low bandwidth technologies over unreliable network links. Fog and IoT devices may rely on narrowband (NB) and ultra-narrowband (UNB) technologies, such as LoRa, which operate below 1 Gigahertz. (A LoRaWan specification is promulgated by the LoRa alliance.) Thus, at least for some fog and IoT devices, an OTA upgrade may not be available.

Further, when field updates go wrong, consumers may end up with an inactive device, which may have to be returned to the manufacturer. Thus, there is a continuing need for a solution that overcomes the shortcomings of the prior art.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

In accordance with the embodiments described herein, a method and apparatus are disclosed for performing authenticated firmware updates, including upgrades or downgrades, of a fog or IoT device, which happens concurrent with a field update of a component coupled to the device, such as a battery. The firmware update is automatically embedded with the component replacement. In addition to a resource replacement apparatus, a method for robust updates includes device verification, device authentication, firmware version verification, and, finally, the firmware update, once other checks are complete. Mechanisms exist to restore the fog or IoT device to an original firmware configuration, even after the component update has occurred, and to make partial firmware updates to components within the target device.

Figure 1:
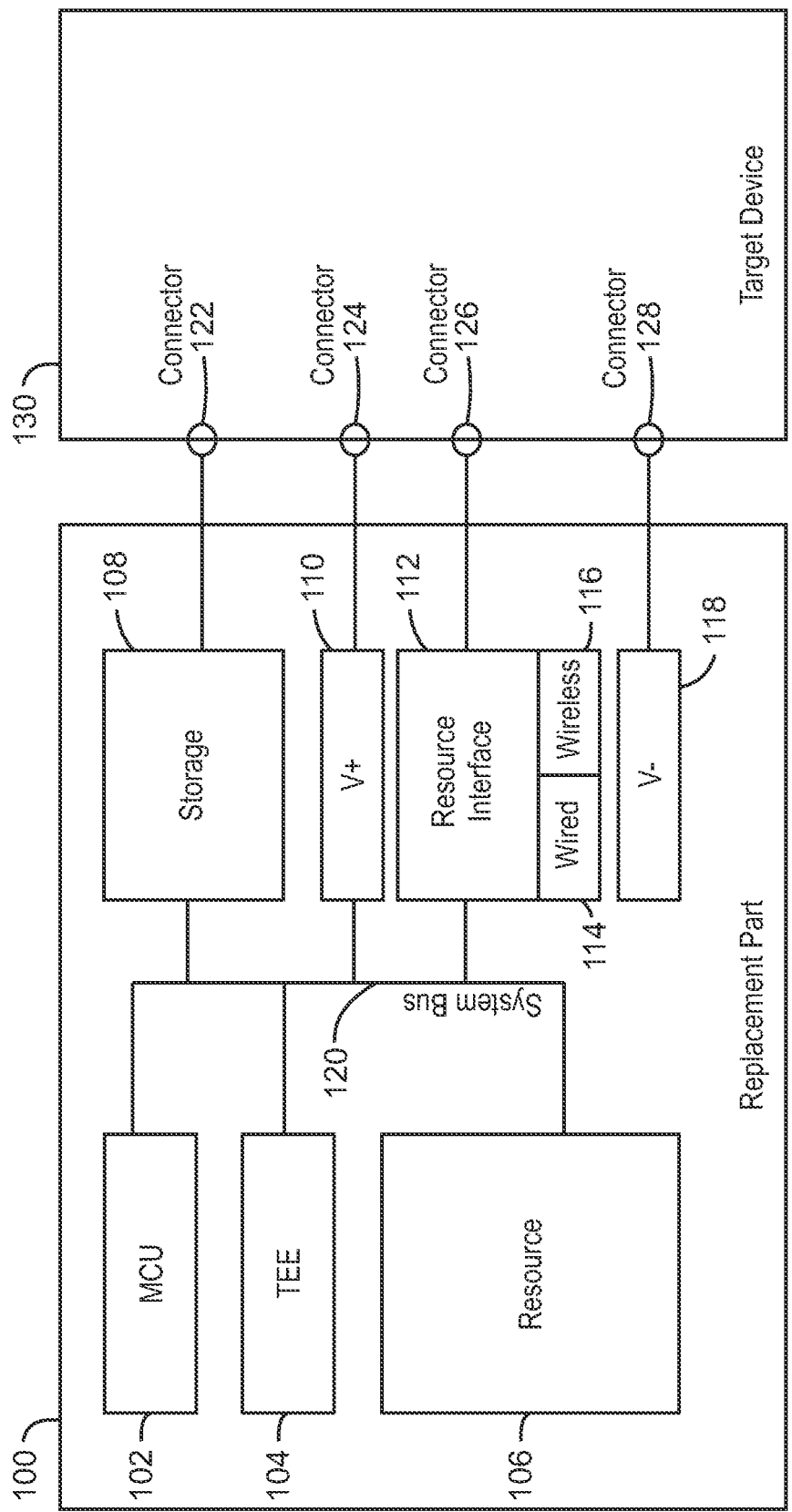
FIG. 1 is a simplified block diagram of a replacement part to be coupled to a target device and implement a field firmware update, according to some embodiments.
Figure 2:
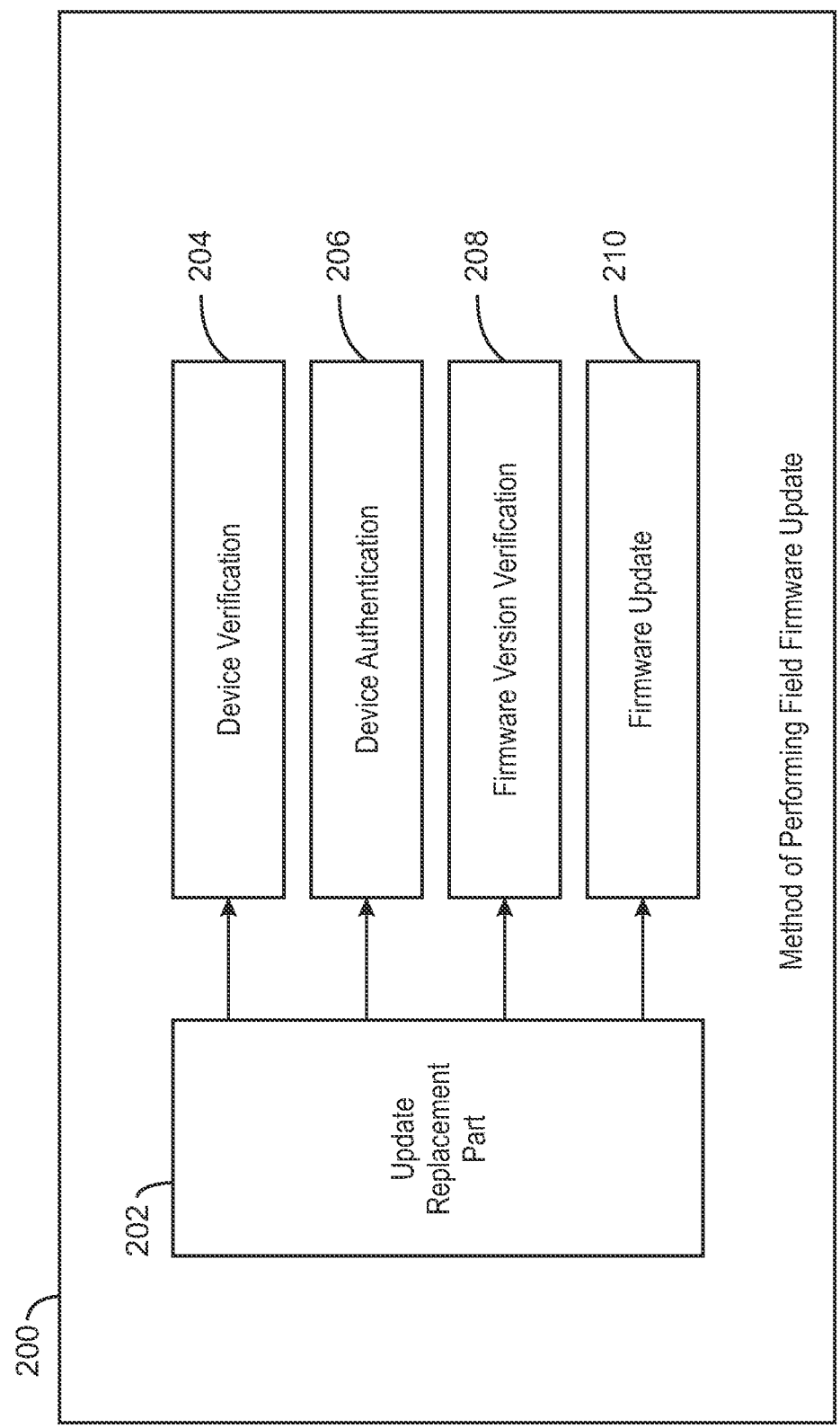
FIG. 2 is a simplified block diagram of the method to implement a field firmware update using the replacement part of FIG. 1, according to some embodiments.

FIGS. 1 and 2 are simplified block diagrams of a replacement part 100 and method 200 for enabling field upgrade of a target device 130, according to some embodiments. Once connected to the target device 130, the replacement part 100 is capable of implementing a robust field upgrade of the target device using the method 200, as described below.

As illustrated in FIG. 1, the replacement part 100 includes a microcontroller unit (MCU) 102, a trusted execute environment (TEE) 104, and a resource 106, as well as storage 108, positive (V+) and negative (V−) voltage terminals 110 and 118, and a resource interface 112. A system bus 120 connects the various devices of the replacement part 100. The replacement part 100 connects to a target device 130, such as in a field replacement operation.

Connectors 122, 124, 126, and 128 provide communication channels between the replacement part 100 and the target device 130. Connectors 124 and 128 provide positive and negative voltage terminals, respectively, to the replacement part 100. Power may be supplied to the replacement part 100 from the target device 130, or the replacement part may house its own power.

The connector 126 provides an interface or communication channel between the replacement part 100, via its resource interface 112, and the target device 130, e.g., the IoT/fog device. In some embodiments, the connector 126 provides an I2C serial bus connection. I2C is a 2-wire serial bus, connecting low-speed devices, such as microcontrollers, in embedded systems. I2C, for example, is currently used for the System Management bus (SMBus) smart battery data specification. In other embodiments, the connector 126 provides a 1-wire bus interface to the target device 130, such as the 1-wire bus defined by Dallas semiconductor to transfer battery data.

In still other embodiments, the connector 126 may provide a wired connection to the target device 130. Examples of wired interfaces include the Serial Peripheral Bus (SPI) and the Joint Test Action Group (JTAG) debug/emulation interface. A JTAG interface, for example, may be used to restore functionality to a device that has stopped working (e.g., a "bricked" device), or for initializing a factory device, or to program modules in a node where JTAG is the sole interface. In some embodiments, rather than a full JTAG implementation, the connector 126 carries a 2-wire JTAG implementation defined in the Institute of Electrical and Electronics Engineers (IEEE) 1149.7 standard or a 2-wire serial wire debug (SWD) implementation.

In still other embodiments, the connector 126 between the replacement part 100 and the target device 130 may be replaced with a short-range wireless interface. Examples include Bluetooth Low Energy (BLE) and Near Field Communication (NFC) interfaces. Thus, the number of pins on the interface 126 is dependent upon the connections selected. Finally, the connector 126 may be implemented as a proprietary interface between the replacement part 100 and the target device 130.

The connector 122 provides a connection between the storage 108 of the replacement part 100 and the target device 130. In some embodiments, the storage 108 consists of non-volatile memory, for storing firmware, application software, basic input output system (BIOS) initialization, field-programmable gate array (FPGA), or neural network (NN) data (collectively described herein as "firmware"), to be transferred to the target device 130, and such updates may take place over the connector 122. Further, the storage 108 may be used to provide back-up storage for firmware currently located on the target device 130, and which is intended to be replaced.

Thus, as one example, the storage 108 may store update firmware for the target device 130, and may also store a backup of the currently installed firmware of the target device. Among other operations of the method 200, the storage 108 allows the firmware to be authenticated before updates of the target device 130 take place.

Also, as described herein, updates to the target device 130 may include an upgrade of the firmware, from a first version to a second, more recent (e.g., newer) version, or downgrades of the firmware, from the second version to the first version. While the motivation for firmware upgrades are understood, a firmware downgrade may take place in response to an unintended behavior of the target device 130 following a previous firmware update. Updates to the target device 130 may also include initializing devices or components of the target device with configuration settings and software and updating software on the device to fix bugs or provide new functionality. Updates to the target device 130 may also include re-installing software on a non-working target device or on non-working components of the target device. Updates to the target device 130 may also include upgrading the target device to use a new hardware component. Updates to the target device 130 may also include changing the initial factory-installed software or firmware to new software or firmware. These many types of software and firmware changes are referred to herein as an update to the firmware of the target device 130.

In some embodiments, the microcontroller (MCU) 102 controls interactions between the replacement part 100 and the target device 130. A smart battery may include a specialized microprocessor such as the MCU 102. The MCU 102 may be characterized by a relatively quick startup period, relative to general processors, and may also include embedded flash memory in which to store and execute a program, such as one that implements the field firmware update method 200 of FIG. 2.

The Trusted Execute Environment (TEE) 104 is a specialized unit of the replacement part 100. Also known as an isolated execution environment, the TEE 104 is a secure area of the MCU 102 and provides isolated execution of code. For example, the replacement part 100 may be booted into the TEE 104, and then a hashtag may be run to ensure the integrity of the code before changes are made to update the target device 130. In some embodiments, the TEE 104 performs one or more of the method steps in FIG. 2 before updates to the target device 130 are made.

Trusted computing is primarily concerned with the ability of a device to attest to trustworthy attributes of a computing device. Attributes typically affecting trust include a trusted or secure boot.

Trusted boot instruments the boot sequence with measurement operations that compute a hash of the next code block to be loaded and executed. Measurements are stored in secure storage of the TEE 104. In an IoT device, the TEE may be a separate device or may be a protected memory region that is encrypted or otherwise not generally accessible to the processor or general operating code of the IoT device. A secure boot is an extension to a trusted boot environment which adds the checking of measurements against a whitelist of permitted processes. Typically, the boot sequence is altered if actual and whitelist measurements do not agree, for example, by booting into a non-secure environment and informing other devices of this.

Once the trusted boot is complete, it may provide the TEE for secure execution. If code is loaded into, or is statically bound, to a hardened execution environment, such as the TEE, the operations performed may resist some attacks. A hardened execution environment may include any number of hardware enhanced security systems, such as a trusted platform module (TPM) to create the TEE. The hardening techniques may include Software Guard Extensions (SGX)

from Intel®, TrustZone® from ARM®, hardware security modules (HSMs) such as a TPM, smart cards, or virtualization, among others.

The TEE may also provide an environment for secure update. Secure boot checks code authenticity at load time. Secure update uses code signing to ensure integrity and authenticity, such as with the Authenticode™ technology from Microsoft. A manifest structure may be used to manage association of code hash values and signatures over hash values as part of the install image. Technologies for installation image packages include the Itsy Package Management System (IPKG), Debian Linux installation files (DEB), RPM package manager files (RPM), and Clear Linux Bundles, among others.

The TEE may provide secure storage for both temporal and long-term storage of security relevant data. Data types include keys, whitelists, blacklists, measurements, audit logs, passwords, biometrics, certificates and policies. Hardening techniques include isolation, anti-tampering, encryption and obfuscation.

In some embodiments, the resource 106 is a battery. A field upgrade of the battery would thus include the entire replacement part 100, not just the resource 106. In other embodiments, the resource 106 is a super capacitor, such as one used in a smart battery. In still other embodiments, the resource 106 is a field-serviceable part of an automobile. In other embodiments, the resource 106 is a drone object. Although shown separately in FIG. 1, the resource 106 is considered a part of the target device 130 and operates with the target device.

FIG. 2 is a schematic diagram of a process 200 for performing a field firmware update of the target device 130 of FIG. 1, according to some embodiments. The method 200 involves updating the replacement part 202, and, from that update, other processes include device verification 204, device authentication 206, firmware version verification 208, and firmware update 210. Embedded within these operations are options to both limit the firmware update of some, but not all, components of the target device 130 as well as backing out of unsuccessful firmware updates. As will be shown, a field update of the replacement part 100 triggers a robust update of the target device 130 firmware.

FIGS. 3-7 are process flow diagrams showing methods of operation of the replacement part 100 in support of the target device 130, according to some embodiments. Operations 202 pertain to the physical update (e.g., swap) of the replacement part 100. Operations 204 pertain to replacement part verification operations. Operations 206 pertain to replacement part authentication operations. Operations 208 pertain to firmware version verification. Operations 210 pertain to firmware updates. In some embodiments, the operations 202 are performed by the field service engineer in support of the target device 130, while operations 204, 206, 208, and 210 are performed automatically by the replacement part 100 once connected to the target device 130. Alternatively, operations 202 to swap out the replacement part 100 are performed by a drone device programmed to perform the field service replacement.

Figure 3:
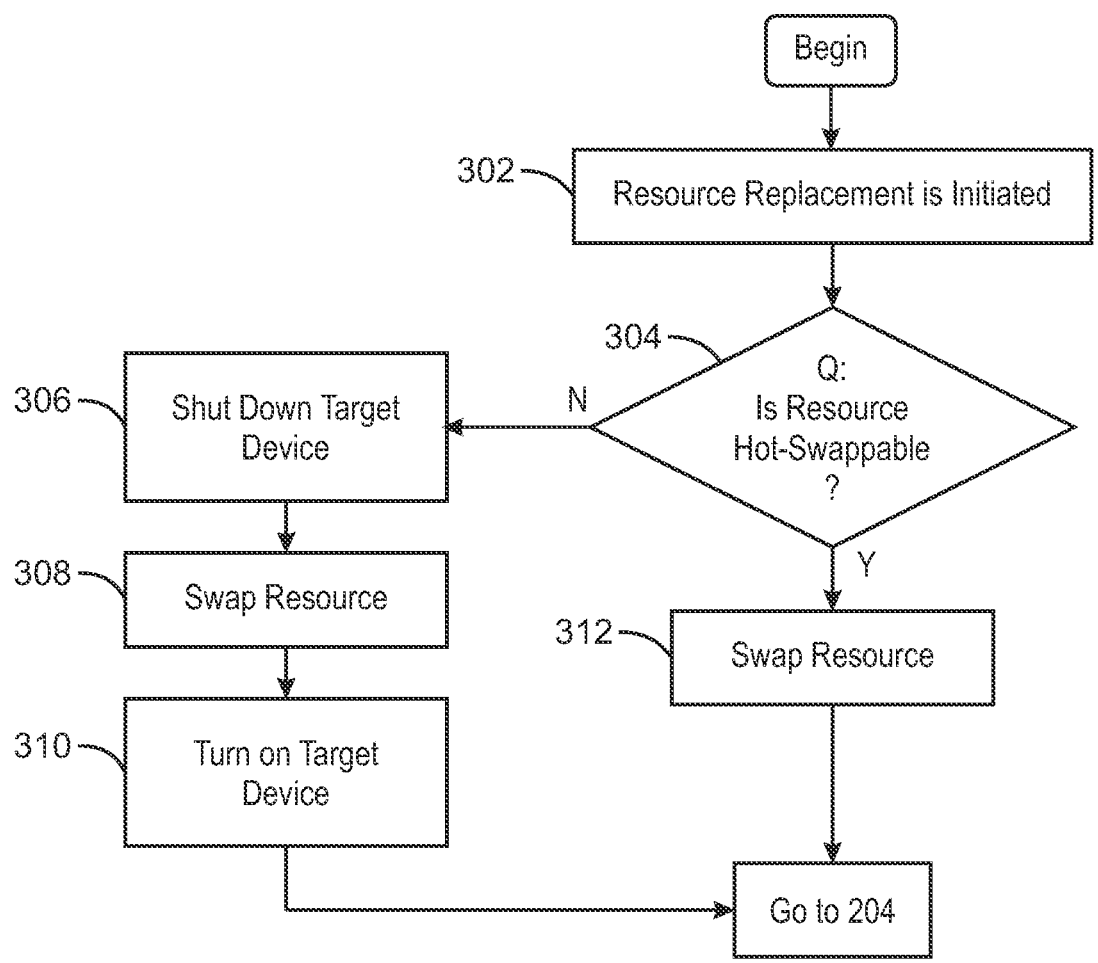
FIGS. 3-7 are flow diagrams showing operations performed by the replacement part of FIG. 1 to implement a field firmware upgrade, according to some embodiments.

FIG. 3 is a process flow diagram of a method for initiating the operations to update the replacement part 100 connected to the target device. Updating the replacement part, as used herein, means that the replacement part is removed and a new replacement part is inserted in its place. In this manner, the target device, which depends upon the resource within the replacement part, such as a battery, is itself updated. The operations commence when the resource, such as a battery, are to be replaced (block 302). For example, a service engineer or other entity, such as a drone, may be tasked to replace the resource in a field-serviceable fog or IoT device (the target device). The resource may be hot-swappable (e.g., replaceable while the target device is running. Alternatively, the resource may be replaced upon power down of the target device. Whether the resource is hot-swappable is known to the field service engineer or drone, in some embodiments.

Thus, in FIG. 3, if the resource may be replaced during standby operation of the target device (the "yes" prong of block 304), then a swap of the resource is made (block 312) by removing a replacement part connected or attached to the target device, then installing the replacement part (FIG. 1) in its place. This swap may take place without initiating any action of the target device 130. Otherwise (the "no" prong of block 304), the target device is turned off or powered down (block 306), the swap between old replacement part and new replacement part is made (block 308), and the target device is turned on again (block 310). The operations 202 are completed and the part of the target device needing a field service upgrade, the resource, is updated via the replacement part.

Following the replacement part update 202, the replacement part is physically coupled to the target device and yet not truly integrated to the target device, because device verification 204, device authentication 206, and firmware version verification 208 have not yet taken place. In some embodiments, the additional operations of the method 200 prevent field upgrades that are not robust. Emerging devices in the fog/IoT ecosystem which have constrained network access still benefit from reliable, rapid updates. When these updates go wrong, consumers may end up with failed devices which have to be returned to the manufacturer. The device verification (204), device authentication (206), firmware version verification (208), and, finally, firmware updates (210) illustrated in FIGS. 4-7 are designed to ensure a robust update is made in the field.

Figure 4:
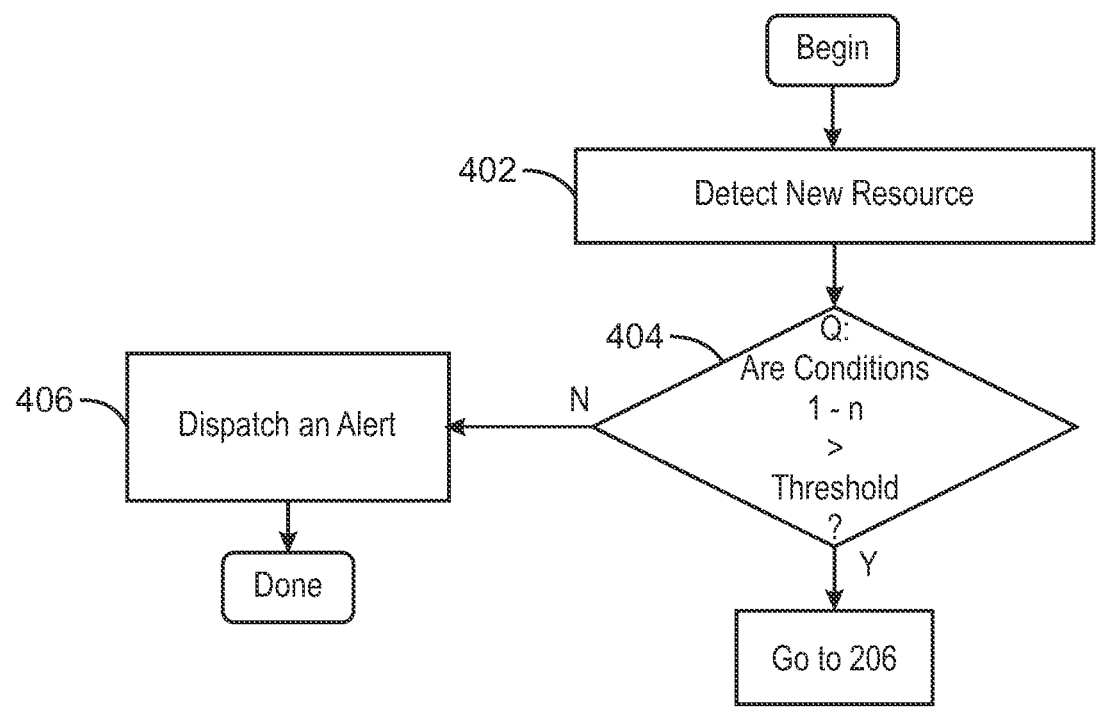

FIG. 4, is a process flow diagram of a method for initiating the device verification operations 204, according to some embodiments. The replacement part detects the new resource, such as a battery (block 402). In some embodiments, the presence of the resource is detected using a Universally Unique IDentifier (UUID) that is stored in a memory of the replacement part, such as the storage (FIG. 1). The UUID of the resource is compared to this stored UUID. In some embodiments, the comparison operations are performed in the TEE of the replacement part. In other embodiments, the UUID is blockchain backed. A blockchain is a distributed database of identity records that is made up of data structure blocks.

Once the UUID is confirmed, one or more conditions is verified before proceeding further (block 404). In FIG. 4, these conditions are given as n conditions, for integer, n. For example, if the resource is battery-powered, a determination is made that there is sufficient power before proceeding. There may be other conditions that are verified before proceeding.

Where the one or more conditions are not satisfied (the "no" prong of block 404), an alert is dispatched and operations cease (block 406). The alert may be directed to the field-service engineer, as one example, such as a light emitting diode (LED) light flashing or an audible indicator, such as a horn. Or, the dispatch may be a digital message directed to a remote device, such as an upstream IoT gateway, a fog node, or a cloud service. Following the alert, the operations are stopped and the firmware update of the target device is not made.

Nevertheless, the appropriate local or remote entity or entities has been notified, enabling subsequent action to occur. The field service engineer, upon receiving the alert, may change out the replacement device with a second replacement device, for example, one that does not have a battery power problem. The remote entity may provide additional instructions to the field service engineer may be able to connect the replacement part to a local power source to charge the battery. Where the n conditions are satisfied (the "yes" prong of block 404), control proceeds to the next operations, the device authentication 206 (FIG. 5).

Figure 5:
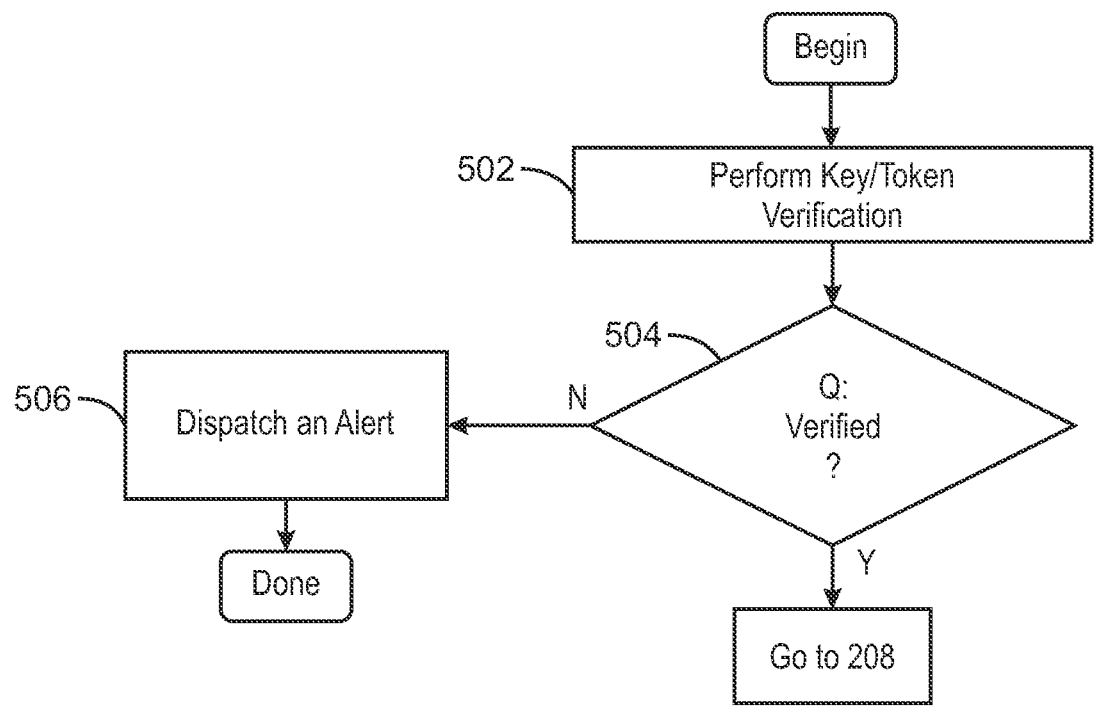

In FIG. 5, is a process flow diagram of a method for performing device authentication operations 206, according to some embodiments. In conjunction with device verification (204) and firmware version verification (208), authentication (206) provides a robust mechanism to perform field upgrades to the target device. In some embodiments, the authentication operations 206 take place in the secure operating environment of the TEE.

Figure 6:
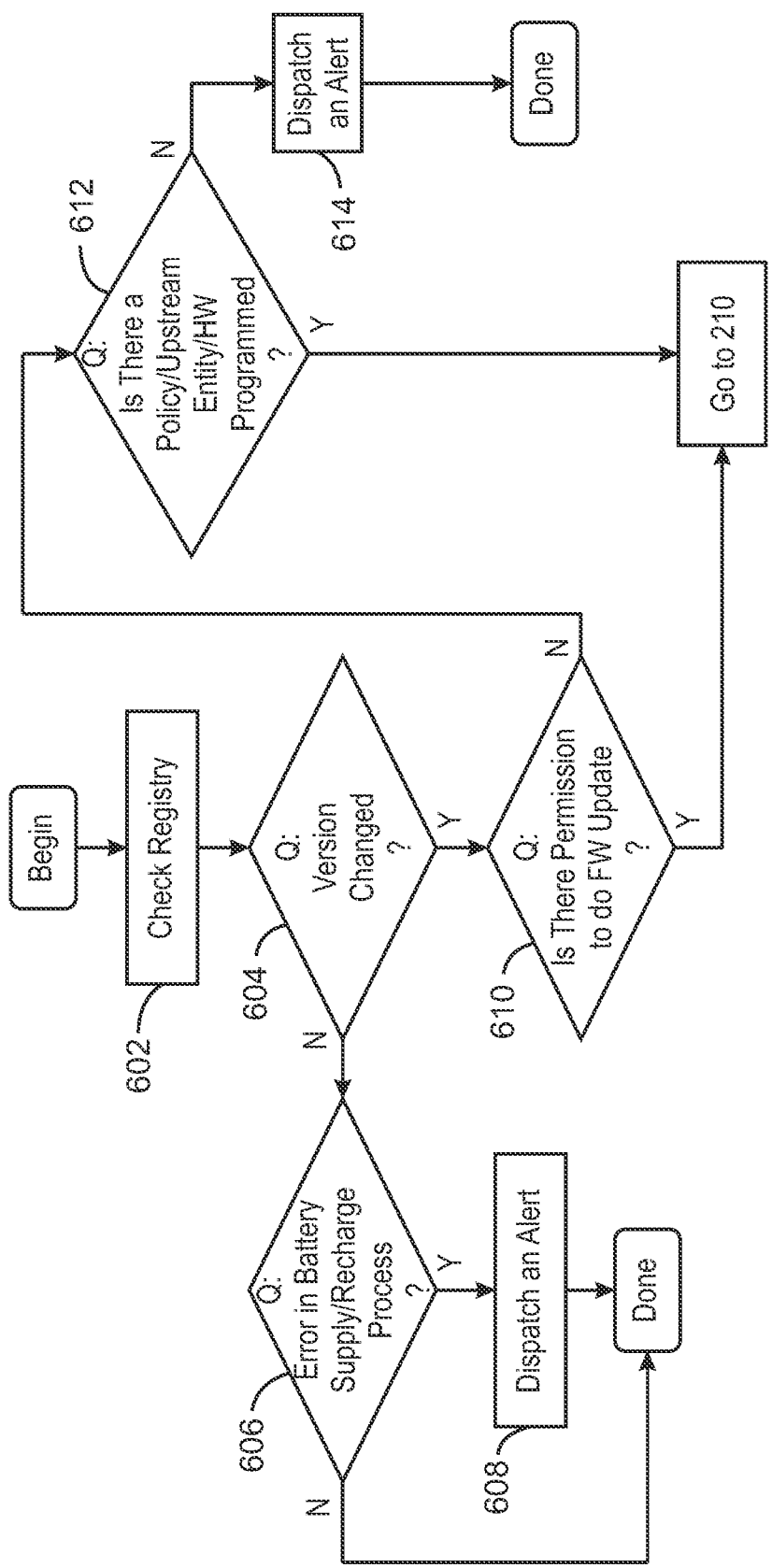

The operation begins by initiating an authentication step (block 502), shown in FIG. 5 as key or token verification. Alternatively, challenge-response mechanisms based on vendor or other party information may be invoked here. The information being authenticated may be embedded in the replacement part, such as in the storage, or may be retrieved from a remote source, such as an upstream IoT gateway, fog node, or cloud service. Once verified (the "yes" prong of block 504), the authentication operations are complete, and control proceeds to the firmware version verification 208 (FIG. 6). The authentication process may take advantage of security enhancements provided by the TEE, such as stored passwords and the like.

If the authentication fails (the "no" prong of block 504), an alert is dispatched (block 506) to notify the field service engineer or upstream device of the failure. Like the alert of FIG. 4, the alert may be audible, visual, or digital. Because the authentication failed, no firmware update to the target device is made, even though the resource (embedded in the replacement part) has been field-replaced.

The target device may include more than one component for which a firmware update is possible. The target device may include a BIOS that is booted or initialized once the target device receives power. Additionally, the target device may include storage media that is operable by separate firmware, a network interface card (NIC) including firmware, and software programs that are executed by a processor. Thus, when discussing firmware version verification 208 or firmware updates 210 to the target device, below, the BIOS, storage media firmware, NIC firmware, application software, and so on, would be candidates for verification and field updates, as described below, and are all thus regarded as "firmware updates" herein.

FIG. 6 is a process flow diagram of a method for initiating the firmware version verification operations 208, according to some embodiments. At this stage, the resource (as part of the replacement part) has been physically swapped, verified, and authenticated. The firmware version verification 208 begins with a check being made to a firmware registry (block 602). The firmware registry enables the replacement part to compare the installed versions (on the target device) and the available versions (on the replacement part) to inform a decision about whether to upgrade or downgrade the firmware.

The registry of firmware installed on the target device may be stored on the target device itself. In some examples, the replacement part may determine and store the firmware versions for the target device by querying the target device. The version of firmware on the target device is thus compared to the registry of firmware (block 604).

If the versions are different (the "yes" prong of block 604), then an update of the target device is possible. If the versions are the same (the "no" prong of block 604), then it is possible that the correct versions of firmware are already installed for all components of the target device. Another option is that an error has been made in the battery supply/recharge process. Thus, an inquiry to this effect is made (block 606), in which case an alert is sent (block 608) as previously described, whether audible, visible, or digital (e.g., to a remote entity). Once the alert is dispatched, no firmware upgrade is made and the firmware verification process 208 is complete. This means that, while the replacement part update means that the resource, such as a battery, has taken place, no firmware update has been made.

Where a version change is detected (the "yes" prong of block 604), a determination is made as to whether a firmware update is allowed (block 610). In some embodiments, the permission step ensures that control of the target device is maintained. The target device may be pre-programmed to indicate whether updates are allowed, such as by a physical setting (e.g., a jumper switch), a software setting, a hard-coded setting, or a setting that may be updated remotely, such as by an IoT gateway, a fog node, or a cloud service. The permission check (block 610) consults one of the settings, whatever the type. The permission check may also be performed in the secure operation environment of the TEE of the replacement part (FIG. 1).

In some embodiments, the target device automatically allows upgrades. In some embodiments, the target device automatically allows downgrades. In some embodiments, the target device automatically allow upgrades and downgrades. In some embodiments, additional modes are available for each of the above options, which will prevent updates, essentially disabling the device where security is an issue.

Figure 7:
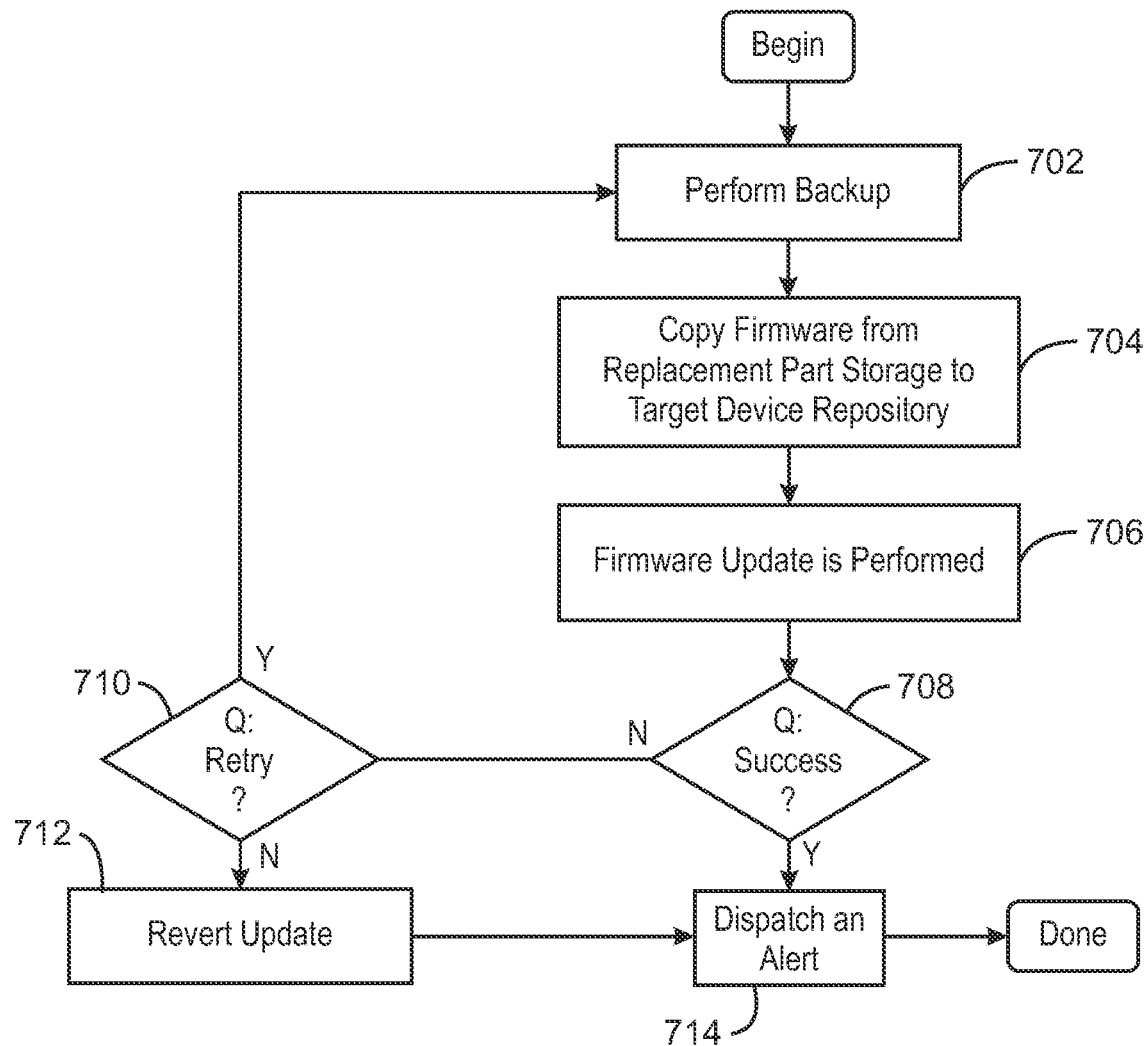

Further, a mode of the target device may allow permissive updates. In the permissive mode, an alert is generated to prompt an authorized entity to allow or deny updates manually. The alert may result in a subsequent action that the field service engineer or other entity can take on the spot, e.g., pressing a hardware switch on the target device or on the replacement part. The alert may be a message that is sent to an upstream device, such as an IoT gateway, fog node, or a cloud service, where a remote support engineer or a central policy maker controls whether the update is allowed. Thus, in FIG. 6, once permission to make a firmware update is made (the "yes" prong of block 610), control proceeds to firmware update operations 210 (FIG. 7). But, if permission has been denied (the "no" prong of block 610), then additional inquiries may be made. In some embodiments, an additional inquiry includes whether there is a policy regarding updates, an upstream entity, such as a central policy maker, who can give permission, or a hardware-programmed device, such as a switch or jumper, that indicates permission (block 612). If not (the "no" prong of block 612), then an alert is dispatched (block 614), as described above, notifying the field service engineer, the upstream entity, or both and no firmware update is made, despite the successful update of the replacement part.

If, however, the additional inquiry bears fruit (the "yes" prong of block 612), then a firmware update to the target device may be possible, even though the previous permission inquiry (block 610) failed. In this circumstance, control proceeds to operations 210 (FIG. 7) in which the firmware update, which may include changes to the firmware of multiple components of the target device, is performed.

In some embodiments, the firmware updates are allowed/ disallowed on a per component basis and may be dependent on factors such as the type of the target device. Thus, in some embodiments, the firmware version verification operations 208 features a level of fine-grained control over what is permitted regarding firmware update of the target device.

FIG. 7 is a process flow diagram of a method for initiating the firmware update operations 210 of the target device by the replacement part, according to some embodiments. At this point, the resource replacement 202, the device verification 204, the device authentication 206, and the firmware version verification 208 operations have confirmed that a firmware update 210 is permitted. Accordingly, the current settings of the target device are backed up to available space on the replacement device, such as the storage (FIG. 1) (block 702). The firmware update located on the storage medium of the replacement device is then copied to a software repository location on the target device (block 704). The target device then performs the update to its firmware, namely an upgrade or a downgrade (block 706). In some embodiments, the update occurs automatically by the target device once the target device detects the firmware copied to its repository. In other embodiments, the target device is prompted by the replacement device to perform the update. In still other embodiments, the firmware update to the target device is performed by the replacement part.

It may be the case that the update involves several resets or reboots of the target device. As the update proceeds, the target device may, for example, send messages to upstream IoT gateways, fog nodes, cloud services, or to the replacement part as to its status. The update is successful when all permitted firmware updates are complete. The success of the update may be determined by the target device itself, or the MCU of the replacement part may run locally stored test software. As another option, the success of the update may be determined based on the status messages sent by the target device to upstream services. In FIG. 7, once the update is successful (the "yes" prong of block 708), an alert message is dispatched (block 714), such as by audio or visual means, to the field service engineer, or digitally to an upstream entity.

If the update fails (the "no" prong of block 708), an inquiry is made whether a retry should take place (block 710). If so, the firmware update operations 210 are repeated. Otherwise, the update is restored or reverted to the original software/firmware version (block 712), since a backup of the original target device firmware exists (block 702). Further, in some embodiments, an alert to that effect is dispatched (block 714), this time to indicate that no firmware update, or, alternatively, an update to some, but not all components of the target device, occurred, and the operations are complete.

The firmware update that takes place (block 706) may involve upgrades or downgrades to one or more components of the target device. If any component update fails, an attempt to roll back the update is made using the original device firmware of that particular component. In some embodiments, the backup that is performed (block 702) will include firmware for all components of the target device. To ensure a stable target device, a complete restoration to the previous state of the target device is made, in some embodiments. In other embodiments, it may be possible to restore or revert to the previous firmware version of the failed component, while leaving updates in place for other components of the target device. In some embodiments, whether all components or some components of the target device are separately updatable is driven by the particular interdependencies which may be present between different versions of the components. The alert dispatched as to the success or failure of any updates or back-out actions are sent to upstream components and/or are sent as visible/audible alerts (for the benefit of the field service engineer or other local entity) on the target device itself.

If an update results in the target device becoming unresponsive or losing its network function, this can be detected in several ways. For example, there may exist a firmware watchdog on the target device. In case of such an occurrence, the replacement device may reset the target device and attempt to reverse the update, so as to restore the target device to an operational state. Once the target device is again communicating, an alert indicating this condition may also be sent, whether locally or to upstream devices.

Thus, the replacement device and the method of performing a firmware update 200 to the target device, as detailed in FIGS. 3-7, may be applied to initialize devices with configuration settings and firmware (such as when the device is still at the factory), updating firmware on devices to fix bugs or provide new functionality, reinstalling firmware on failed devices, and updating modular devices to support new hardware components.

Operating Environment

The following is a description of operating environments which may utilize the principles described herein of supporting a target device with a replacement device which implements firmware updates as illustrated in FIGS. 3-7.

The internet of things (IoT) is a system in which a large number of computing devices are interconnected to each other and to a communications network (e.g., the Internet) to provide a functionality, such as data acquisition and actuation, at very low levels in networks. Low levels indicate devices that may be located at or near the edges of networks, such as the last devices before the networks end. As used herein, an IoT device may include a device performing a function, such as sensing or control, among others, in communication with other IoT devices and a communications network. The IoT device may include an autonomous or semiautonomous device configured to perform one or more functions. Often, IoT devices can be limited in memory, size, or functionality, allowing larger numbers to be deployed for a similar cost to a smaller number of larger devices. However, an IoT device may be a smart phone, laptop, tablet, PC, and/or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity including a combination of wired and wireless technologies as depicted in FIGS. 8 and 9.

Figure 8:
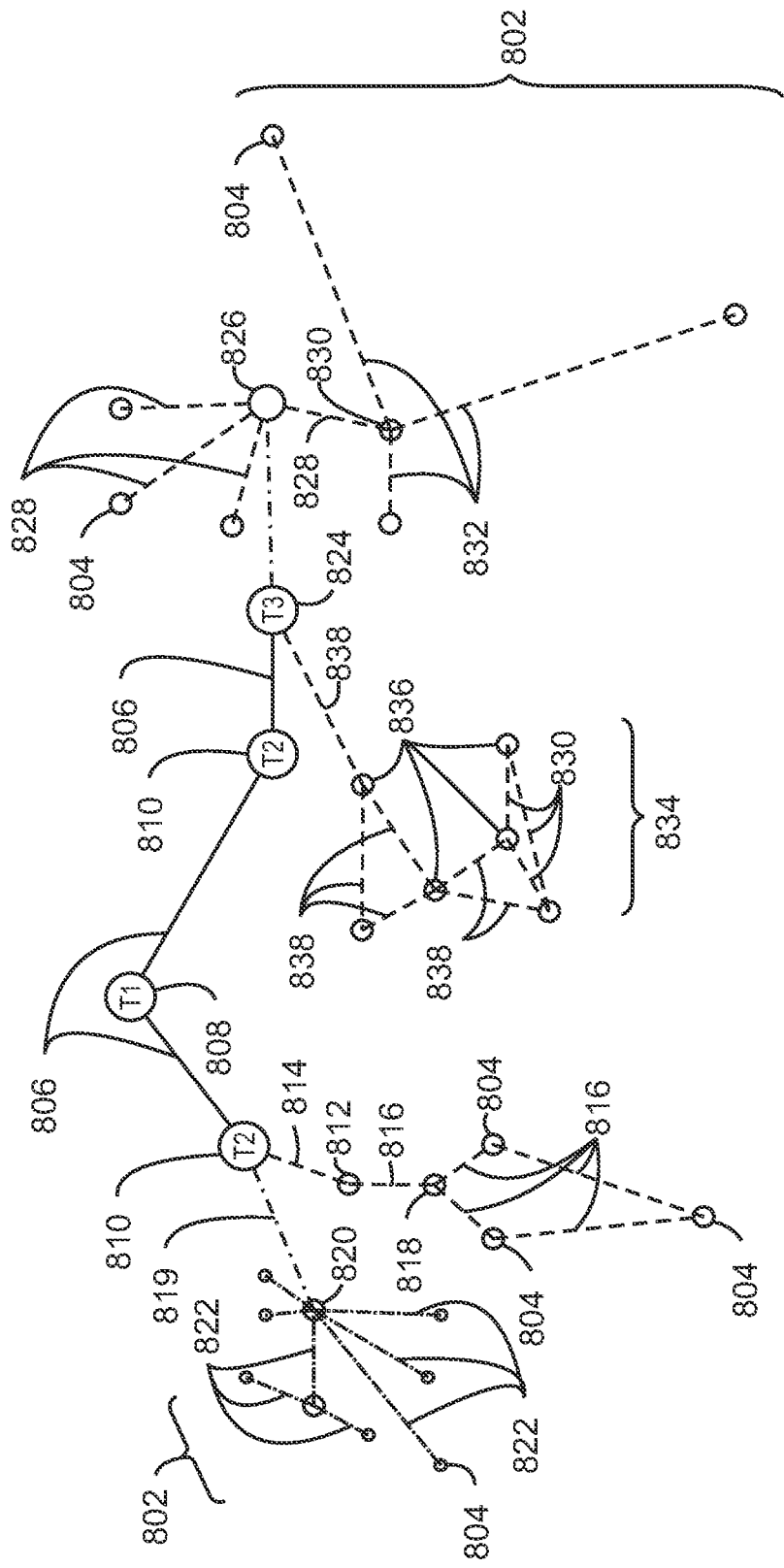
FIG. 8 is a drawing of interconnections that may be present in the Internet in accordance with some embodiments.
Figure 9:
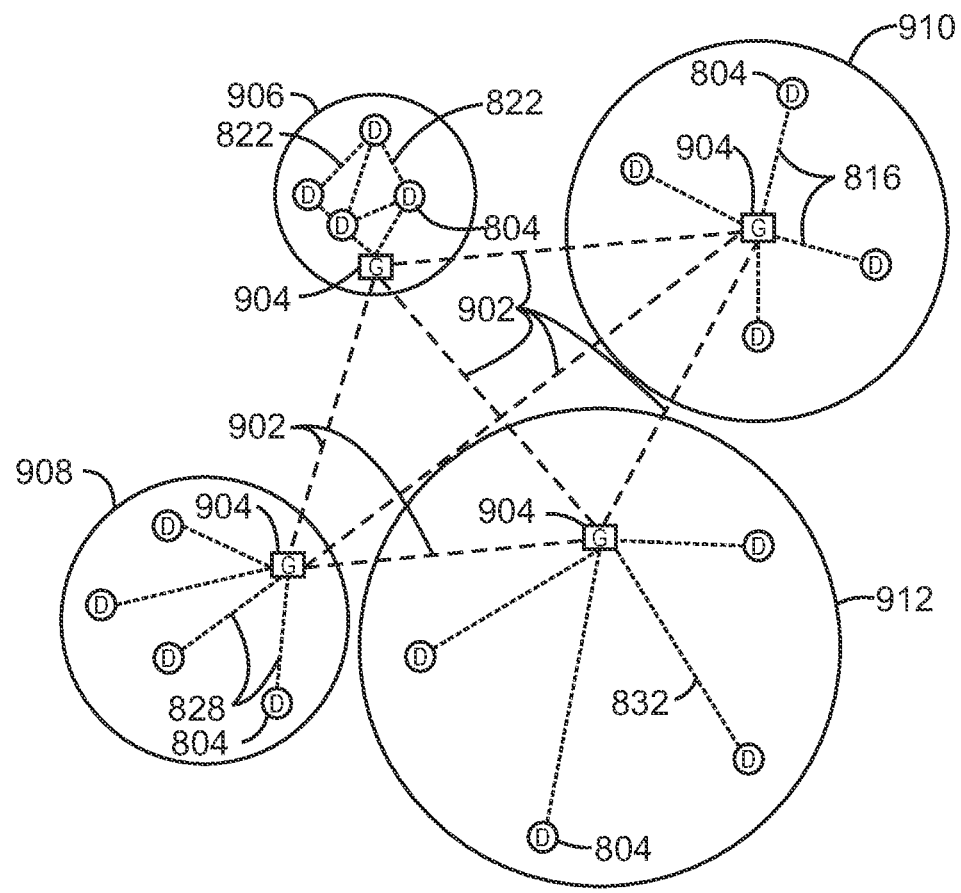
FIG. 9 is a drawing of a network topology for a number of internet-of-things (IoT) networks coupled through backbone links to gateways in accordance with some embodiments.

FIG. 8 is a drawing of interconnections that may be present between the Internet 800 and IoT networks in accordance with some embodiments. The interconnections may couple smaller networks 802, down to the individual IoT device 804, to the backbone 806 of the Internet 800. To simplify the drawing, not every device 804, or other object, is labeled.

In FIG. 8, top-level providers, which may be termed tier 1 ("T1") providers 808, are coupled by the backbone 806 of the Internet to other providers, such as secondary or tier 2 ("T2") providers 810. In some aspects, the backbone 806 can include optical fiber links. In one example, a T2 provider 810 may couple to a tower 812 of an LTE cellular network, for example, by further links, by microwave communications 814, or by other communications technologies. The tower 812 may couple to a mesh network including IoT devices 804 through an LTE communication link 816, for example, through a central node 818. The communications between the individual IoT devices 804 may also be based on LTE communication links 816.

In another example, a high-speed uplink 820 may couple a T2 provider 810 to a gateway 820. A number of IoT devices 804 may communicate with the gateway 820, and with each other through the gateway, for example, over Bluetooth low energy (BLE) links 822. One or more of the IoT devices may be the target device 130 that is device and/or firmware updated, as described in FIGS. 1-7, above.

The backbone 806 may couple lower levels of service providers to the Internet, such as tier 3 ("T3") providers 824. A T3 provider 824 may be considered a general Internet service provider (ISP), for example, purchasing access to the backbone 806 from a T2 provider 810 and providing access to a corporate gateway 826 and other customers.

From the corporate gateway 826, a wireless local area network (WLAN) can be used to communicate with IoT devices 804 through Wi-FM links 828. A Wi-Fi link 828 may also be used to couple to a low power wide area (LPWA) gateway 830, which can communicate with IoT devices 804 over LPWA links 832, for example, compatible with the LoRaWan specification promulgated by the LoRa alliance.

The T3 provider 824 may also provide access to a mesh network 834 through a coordinator device 836 that communicates with the T3 provider 824 using any number of communications links, such as an LTE cellular link, an LPWA link, or a link 838 based on the IEEE 802.15.4 standard, such as Zigbee®. Other coordinator devices 836 may provide a chain of links that forms cluster tree of linked devices.

In some aspects, one or more IoT devices 804 include an appropriate transceiver for the communications with other devices. Further, one or more IoT devices 804 may include other radio, optical, or acoustic transceivers, as well as wired network interfaces, for communications using additional protocols and frequencies. In some aspects, one or more IoT devices 804 includes components described in regard to FIG. 12, below.

The technologies and networks may enable the growth of devices and networks. As the technologies grow, the network may be developed for self-management, functional evolution, and/or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

FIG. 9 is a drawing of a network topology 900 that may be used for a number of internet-of-things (IoT) networks coupled through backbone links 902 to gateways 904, in accordance with some embodiments. Like numbered items are as described with respect to FIG. 8. Further, to simplify the drawing, not every device 804, or communications link 816, 822, 828, or 832 is labeled. The backbone links 902 may include any number of wired or wireless technologies, and may be part of a local area network (LAN), a wide area network (WAN), or the Internet.

Although the typologies in FIG. 9 are hub-and-spoke and the typologies in FIG. 8 are peer-to-peer, it may be observed that these are not in conflict, but that peer-peer nodes may behave as hub-and-spoke through gateways. It may also be observed in FIG. 9 that a sub-net topology may have multiple gateways, rendering it a hybrid topology rather than a purely hub-and-spoke topology.

The network topology 900 may include any number of types of IoT networks, such as a mesh network 906 using Bluetooth Low Energy (BLE) links 822. Other IoT networks that may be present include a WLAN network 908, a cellular network 910, and an LPWA network 912. Each of these IoT networks may provide opportunities for new developments, as described herein.

Figure 10:
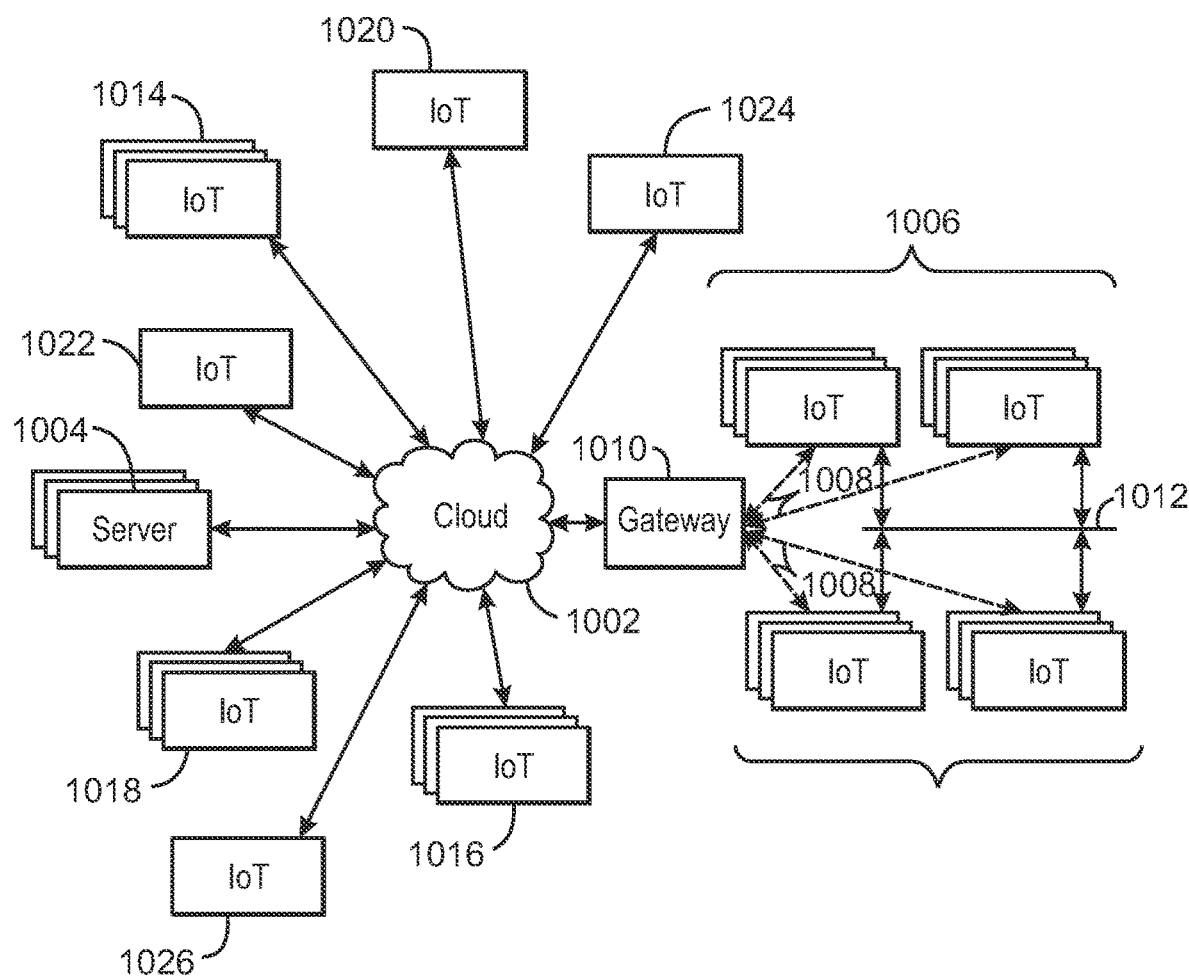
FIG. 10 is a drawing of a cloud computing network, or cloud, in communication with a number of IoT devices in accordance with some embodiments.

FIG. 10 is a drawing 1000 of a cloud computing network, or cloud 1002, in communication with a number of Internet of Things (IoT) devices in accordance with some embodiments. The cloud 1002 may represent the Internet, or may be a local area network (LAN), or a wide area network (WAN), such as a proprietary network for a company. The IoT devices may include any number of different types of devices, grouped in various combinations. One or more of the IoT devices may be the target device 130 that is device and/or firmware updated, as described in FIGS. 1-7, above.

For example, a seismic measurement group 1006 may include field-located IoT devices along a fault line. These IoT devices may include seismographs, flow monitors, cameras, weather sensors, and the like, and may use low-bandwidth long-term radio links for communicating data. The seismic measurement group 1006, or other subgroups, may be in communication with the cloud 1002 through wireless links 1008, such as LPWA links, and the like. Further, a wired or wireless sub-network 1012 may allow the IoT devices to communicate with each other, such as through a local area network, a wireless local area network, and the like. The IoT devices may use another device, such as a gateway 1010 to communicate with the cloud 1002.

Other groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, or both.

As can be seen from FIG. 10, a large number of IoT devices may be communicating through the cloud 1002. This may allow different IoT devices to request or provide information to other devices autonomously. For example, the seismic measurement group 1006 may request a current weather forecast from a group of remote weather stations 1014, which may provide the forecast without human intervention.

Clusters of IoT devices, such as the remote weather stations 1014 or the seismic measurement group 1006, may be equipped to communicate with other IoT devices as well as with the cloud 1002. This may allow the IoT devices to form an ad-hoc network between the devices, allowing them to function as a single device, which may be termed a fog device. The fog device is discussed further with respect to FIG. 11, below.

Figure 11:
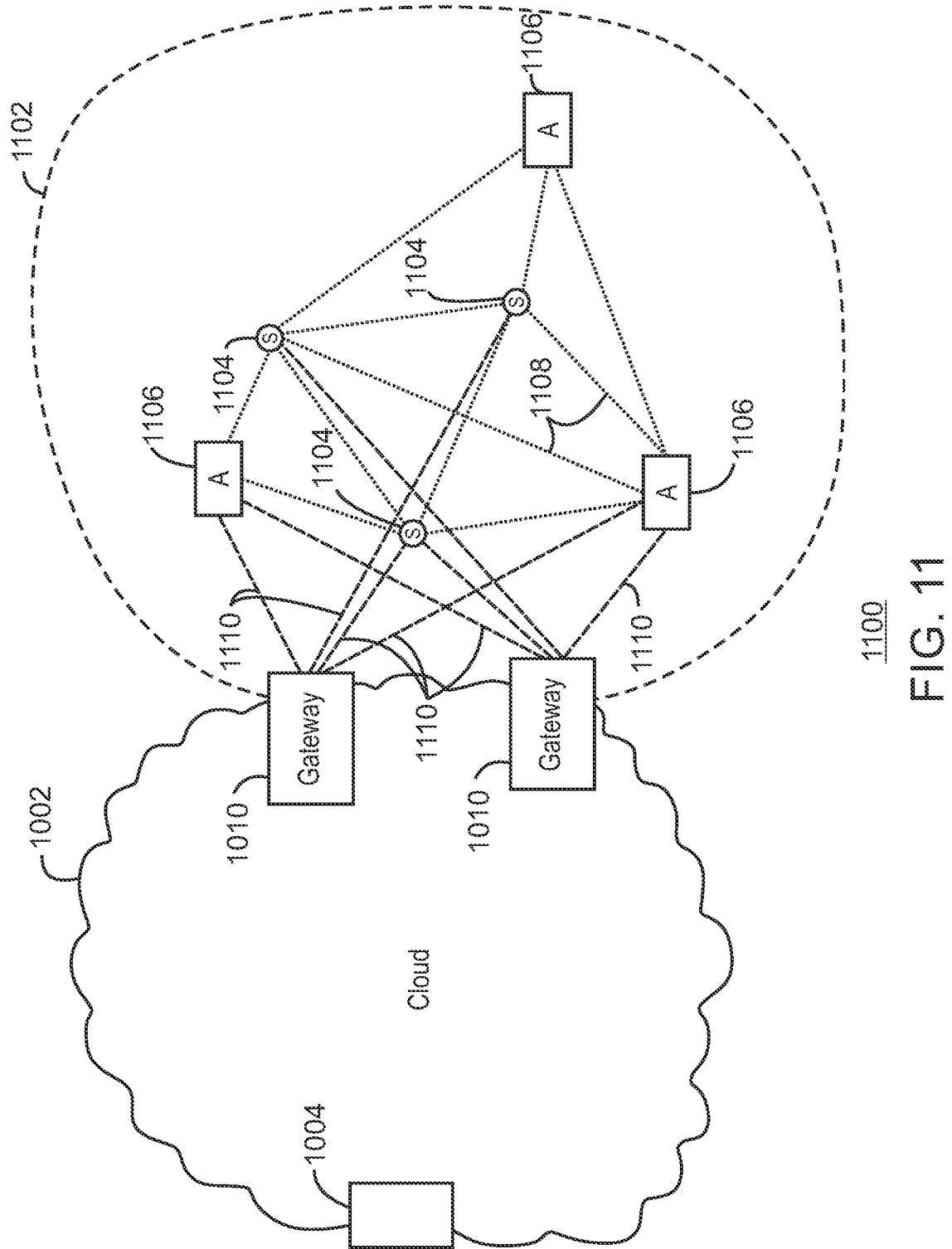
FIG. 11 is a drawing of a cloud computing network, or cloud, in communication with a mesh network of IoT devices, which may be termed a fog device, operating at the edge of the cloud in accordance with some embodiments.

FIG. 11 is a drawing 1100 of a cloud computing network, or cloud 1002, in communication with a mesh network of IoT devices, which may be termed a fog device 1102, operating at the edge of the cloud 1002, in accordance with some embodiments. Like numbered items are as described with respect to FIG. 10. As used herein, a fog device 1102 is a cluster of devices that may be grouped to perform a specific function, such as seismic monitoring, weather control, plant control, and the like.

In this example, the fog device 1102 includes a group of IoT devices at a traffic intersection. The fog device 1102 may be established in accordance with specifications released by the OpenFog Consortium (OFC), among others. These specifications allow the formation of a hierarchy of computing elements between the gateways 1010 coupling the fog device 1102 to the cloud 1002 and to endpoint devices, such as seismographs 1104 and data aggregators 1106, in this example. The fog device 1102 can leverage the combined processing and network resources that the collective of IoT devices provides. Accordingly, a fog device 1102 may be used for any number of applications including, for example, financial modeling, weather forecasting, traffic analyses, and the like.

For example, activity along a fault line going through a city may be tracked by a plurality of seismographs 1104 (e.g., three seismographs 1104). Analysis of the seismographic data may be collected by aggregators 1106 that are in communication with the seismographs 1104 and each other through a mesh network. Data may be uploaded to the cloud 1002, and commands received from the cloud 1002, through gateways 1010 that are in communication with the seismographs 1104 and the aggregators 1106 through the mesh network.

Any number of communications links may be used in the fog device 1102. Shorter-range links 1108, for example, compatible with IEEE 802.15.4, may provide local communications between IoT devices that are proximate to the intersection. Longer-range links 1110, for example, compatible with LPWA standards, may provide communications between the IoT devices and the gateways 1010. To simplify the diagram, not every communication link 1108 or 1110 is labeled with a reference number.

The fog device 1102 may be considered to be a massively interconnected network wherein a number of IoT devices are in communications with each other, for example, by the communication links 1108 and 1110. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 1010, for example, the path having the fewest number of intermediate hops, or the highest bandwidth, among others. In these networks, the number of interconnections provide substantial redundancy, allowing communications to be maintained, even with the loss of a number of IoT devices. In some aspects, the fog device 1102 can include temporary IoT devices. In other words, not all of the IoT devices may be permanent members of the fog device 1102.

The fog device 1102 formed from the IoT devices may be presented to clients in the cloud 1002, such as the server 1004, as a single device located at the edge of the cloud 1002. In this example, the control communications to specific resources in the fog device 1102 may occur without identifying any specific IoT device within the fog device 1102. Accordingly, if one IoT device within the fog device 1102 fails, other IoT devices in the fog device 1102 may be able to discover and control a resource, such as an actuator, or other device attached to an IoT device As illustrated by the fog device 1102, the organic evolution of IoT networks is central to improving or maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Figure 12:
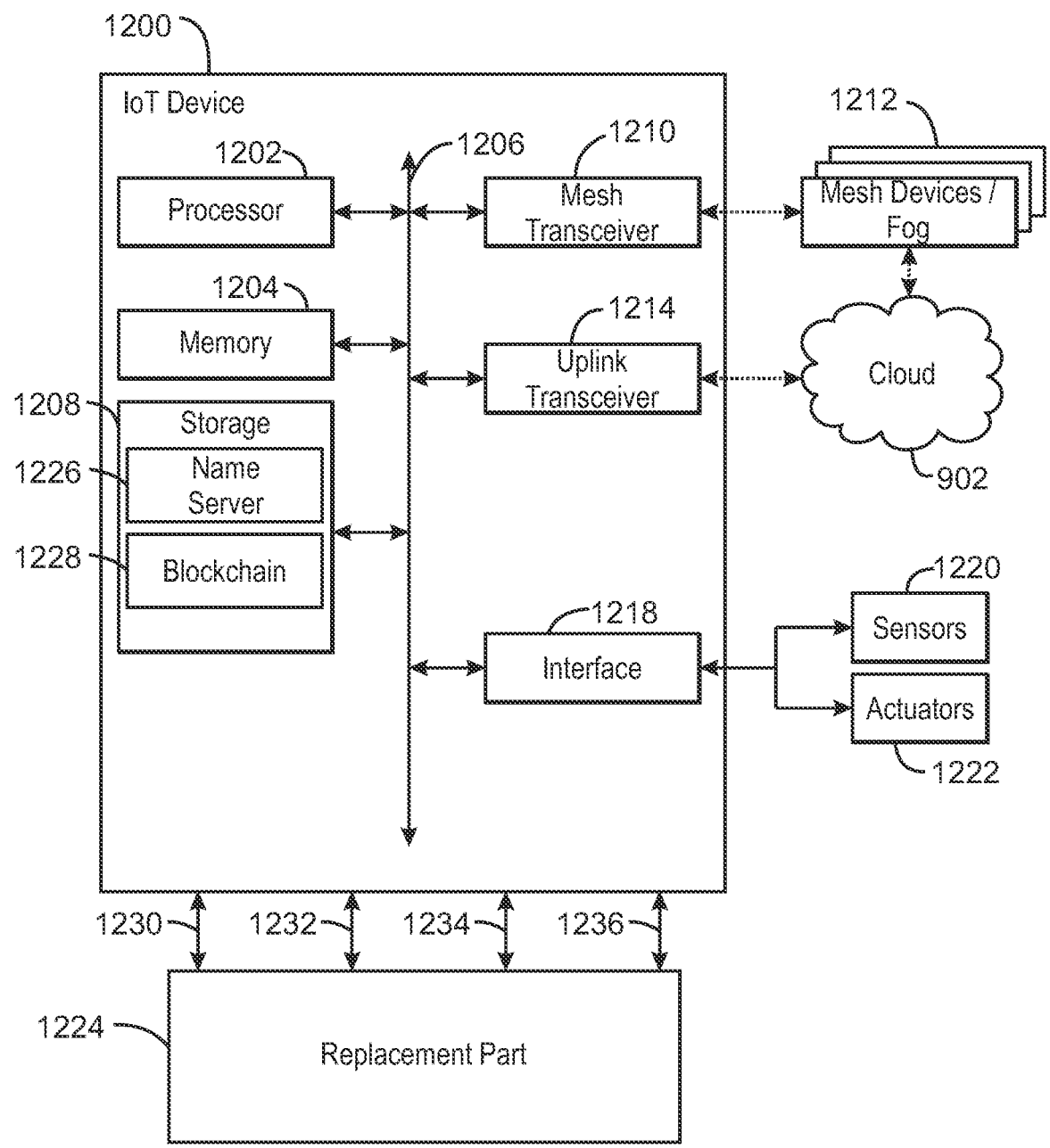
FIG. 12 is a block diagram of an example of components that may be present in an IoT device having a replacement part such as the replacement part of FIG. 1, in accordance with some embodiments.

FIG. 12 is a block diagram of an example of components that may be present in an IoT device 1200 for which a physical resource update, a field firmware update, or both resource and firmware updates may be performed. The IoT device 1200 may be the target device 130 being updated in FIGS. 1 and 2, above. The IoT device 1200 may include any combinations of the components shown in the example. The components may be implemented as ICs, portions thereof, discrete electronic devices, or other modules, logic, hardware, software, firmware, or a combination thereof adapted in the IoT device 1200, or as components otherwise incorporated within a chassis of a larger system. The block diagram of FIG. 12 is intended to show a high-level view of components of the IoT device 1200. However, some of the components shown may be omitted, additional components may be present, and different arrangement of the components shown may occur in other implementations.

The IoT device 1200 may include a processor 1202, which may be a microprocessor, a multi-core processor, a multithreaded processor, an ultra-low voltage processor, an embedded processor, or other known processing element. The processor 1202 may be a part of a system on a chip (SoC) in which the processor 1202 and other components are formed into a single integrated circuit, or a single package, such as the Edison™ or Galileo™ SoC boards from Intel. As an example, the processor 1202 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processor 1202 may include units such as an A5-A9 processor from Apple® Inc., a Snapdragon™ processor from Qualcomm® Technologies, Inc., or an OMAP™ processor from Texas Instruments, Inc.

The processor 1202 may communicate with a system memory 1204 over a bus 1206. Any number of memory devices may be used to provide for a given amount of system memory. As examples, the memory can be random access memory (RAM) in accordance with a Joint Electron Devices Engineering Council (JEDEC) low power double data rate (LPDDR)-based design, such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations, the individual memory devices may be of any number of different package types such as single die package (SDP), dual die package (DDP) or quad die package (Q17P). These devices, in some embodiments, may be directly soldered onto a motherboard to provide a lower profile solution, while in other embodiments, the devices are configured as one or more memory modules that, in turn, couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1208 may also be coupled to the processor 1202 via the bus 1206. To enable a thinner and lighter system design, the mass storage 1208 may be implemented via a solid state drive (SSD). Other devices that may be used for the mass storage 1208 include flash memory cards, such as SD cards, microSD cards, xD picture cards, and the like, and USB flash drives.

In low power implementations, the mass storage 1208 may be on-die memory or registers associated with the processor 1202. However, in some examples, the mass storage 1208 may be implemented using a micro hard disk drive (HDD). Further, any number of new technologies may be used for the mass storage 1208 in addition to, or instead of, the technologies described, such resistance change memories, phase change memories, holographic memories, or chemical memories, among others. For example, the IoT device 1200 may incorporate the 3D XPOINT memories from Intel® and Micron®.

The components may communicate over the bus 1206. The bus 1206 may include any number of technologies, including industry standard architecture (ISA), extended ISA (EISA), peripheral component interconnect (PCI), peripheral component interconnect extended (PCIx), PCI express (PCIe), or any number of other technologies. The bus 1206 may be a proprietary bus, for example, used in a SoC based system. Other bus systems may be included, such as an I$^2$C interface, I$^3$C interface, an SPI interface, point to point interfaces, and a power bus, among others.

The bus 1206 may couple the processor 1202 to a mesh transceiver 1210, for communications with other mesh devices 1212. The mesh transceiver 1210 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1212. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1210 may communicate using multiple standards or radios for communications at different range. For example, the IoT device 1200 may communicate with geographically proximate devices, e.g., within about 10 meters, using a local transceiver based on BLE, or another low power radio, to save power. More distant mesh devices 1212, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1210 may be incorporated into an MCU as an address directly accessible by the chip, such as in the Curie® units available from Intel.

An uplink transceiver 1214 may be included to communicate with devices in the cloud 1002. The uplink transceiver 1214 may be LPWA transceiver that follows the IEEE 802.15.4, IEEE 802.15.4g, IEEE 802.15.4e, IEEE 802.15.4k, or NB-IoT standards, among others. The IoT device 1200 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1210 and uplink transceiver 1214, as described herein. For example, the radio transceivers 1210 and 1212 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 1210 and 1212 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+(High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11 ad, IEEE 802.11 ay, and the like. In addition to the standards listed above, any number of satellite uplink technologies may be used for the uplink transceiver 814, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

The bus 1206 may couple the processor 1202 to an interface 1218 that is used to connect external devices. The external devices may include sensors 1220, such as accelerometers, level sensors, flow sensors, temperature sensors, pressure sensors, barometric pressure sensors, and the like. The interface 1818 may be used to connect the IoT device 1200 to actuators 1222, such as power switches, valve actuators, an audible sound generator, a visual warning device, and the like.

While not shown, various input/output (I/O) devices may be present within, or connected to, the IoT device 1200. For example, a display may be included to show information, such as sensor readings or actuator position. An input device, such as a touch screen or keypad may be included to accept input.

The mass storage 1208 may include a number of modules to implement the group creation functions described herein. Although shown as code blocks in the mass storage 1208, it may be understood that any of the modules may be fully or partially replaced with hardwired circuits, for example, built into an application specific integrated circuit (ASIC). A name server 1226 may be included to provide name support and commit names to the blockchain 1228. The name server 1226 may confirm that the name selected is not in current use, and issue credentials to sub-objects to act on behalf of the group object.

The blockchain 1228 includes a transactional database that includes blocks of data that have transactions corresponding to names of group objects, the sub-objects forming the group object, and the current status of the group objects, such as formed, evolved, or dissolved. In addition to identification information, the blockchain 1228 may include authorization information, such as public encryption keys for group objects and sub-objects. A copy of the blockchain 1228 may be kept on a portion or all of the IoT devices in a mesh network. This allows other IoT devices to confirm changes in the blockchain 1228 and flag any attempts to change the blockchain 1228 without proper authorization. Although used for group identification transactions in this example, the blockchain 1228 may be used for any number of other transactions related to security, payments, transactions, and the like, as described herein. Authority to update to the new resource 106 of the replacement part 100 in FIG. 1 may employ the blockchain 1228.

Interfaces 1230, 1232, 1234, and 1236 connect the IoT device 1200 to a replacement part 1224, such as the replacement part 100 of FIG. 1. Connectors 1230 and 1232, for example, may provide positive and negative voltage terminals, respectively, to the replacement part 1224. The connector 1234 may provide an interface or communication channel between the replacement part 1224 and the target device 1200. In some embodiments, the connector 1234 provides a 2-wire JTAG wired connection to the replacement part 1224. The connector 1236 may provide a connection between the storage of the replacement part 1224 and the storage 1208 of the target device 1200.

Figure 13:
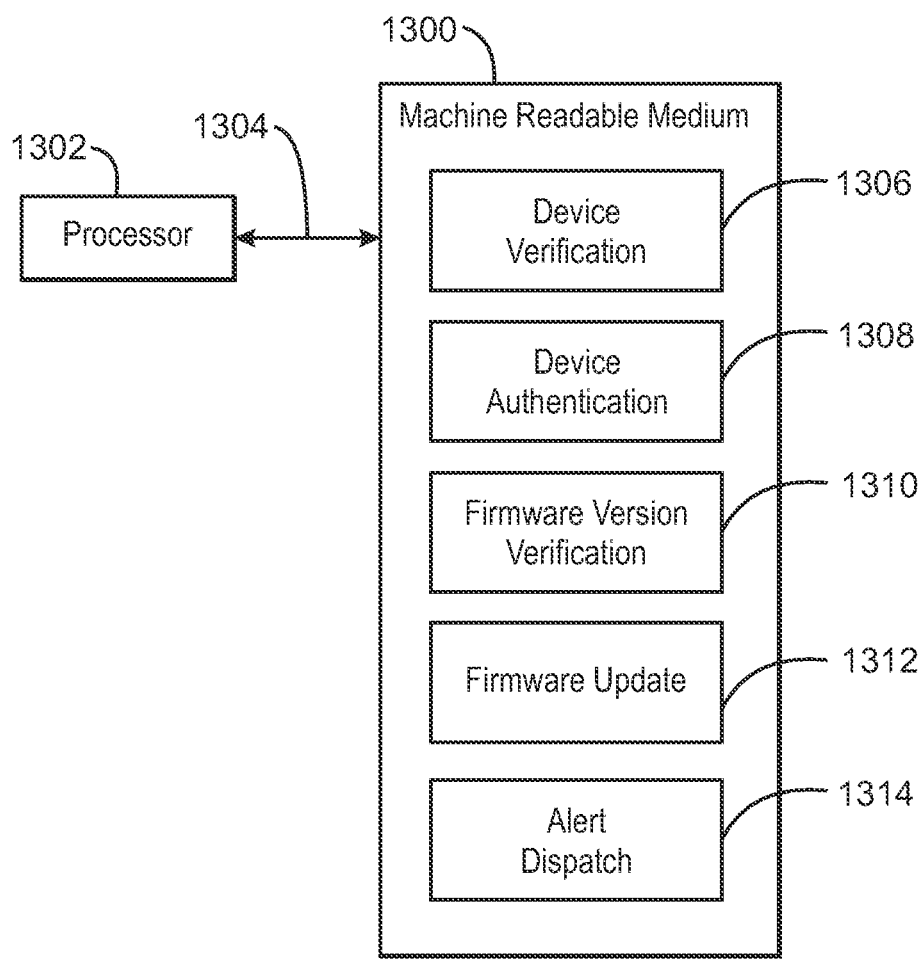
FIG. 13 is a block diagram of a non-transitory, machine readable medium including code to direct a processor to perform firmware updates in conjunction with field-replaceable resources, in accordance with some embodiments.

FIG. 13 is a block diagram of an exemplary non-transitory, machine readable medium 1300 including code to direct a processor 1302 to perform the field firmware update of an IoT device, in accordance with some embodiments. The processor 1302 may access the non-transitory, machine readable medium 1300 over a bus 1304. The processor 1302 and bus 1304 may be selected as described with respect to the processor 1202 and bus 1206 of FIG. 12. The non-transitory, machine readable medium 1300 may include devices described for the storage 108 of FIG. 1 or may include optical disks, thumb drives, or any number of other hardware devices.

The non-transitory, machine readable medium 1300 may include code 1306 to direct the processor 1302 to verify the resource 106 being replaced in the target device 130, for example, as described with respect to FIGS. 1-3. Code 1308 may be included to direct the processor 1302 to perform authentication of the resource 106, for example, by performing key or token verification, as in FIG. 5.

The machine readable medium 1300 may further include code 1310 to direct the processor 1302 to verify the firmware version of the target device 130, as well as the replacement firmware version, ensuring that a firmware update to the target device is prudent. The code 1310 may also ensure that permission to update the firmware of the target device 130 is allowed. The code 1310 may also consult the target device 130 for additional permission, such as a jumper or switch, or may consult an upstream entity for the additional permission. The code 1310 may further dispatch an alert in lieu of performing a firmware update of the target device 130, due to an error in the resource that makes an update imprudent.

The machine readable medium 1300 may further include code 1312 to direct the processor 1302 to perform the firmware update, whether an upgrade in firmware, a downgrade in firmware, or a partial update of some, but not all, components of the target device 130. The machine readable medium 1300 may include code 1314 to direct the processor to dispatch one or more alerts in response to conditions being met or not met while attempting to update the firmware on the target device 130.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

EXAMPLES

In summary, the replacement part 100 may be implemented as an apparatus comprising a resource to be coupled to a target device, the target device comprising current firmware, a storage to store a firmware update of the target device, and a microcontroller comprising embedded memory to execute a program, wherein the program detects the presence of the resource and initiates operations to update the firmware of the target device.

Further to the first example or any other example discussed herein, in a second example, the firmware update of the target device is selected from a group consisting of upgrading the current firmware of the target device, upgrading the current firmware of a component of the target device, downgrading the current firmware of the target device, downgrading the current firmware of the component of the target device, initializing the target device with configuration settings and software, initializing a component of target device with configuration settings and software, upgrading software on the target device to fix bugs or provide new functionality, upgrading software on the component of the target device to fix bugs or provide new functionality, re-installing software or firmware on a non-working target device, re-installing software or firmware on a non-working component of the target device, upgrading software or firmware of the target device to support a new hardware component, and upgrading software or firmware of the component of the target device to support the new hardware component.

Further to the second example or any other example discussed herein, in a third example, the apparatus may comprise a trusted execute environment to isolate execution of the program.

Further to the third example or any other example discussed herein, in a fourth example, the current version of firmware comprises originally installed software or firmware of the target device.

Further to the fourth example or any other example discussed herein, in a fifth example, the program further saves the current version of firmware of the target device, and reverts to the current version of firmware following a failure to replace the current version with the firmware update.

Further to the second example or any other example discussed herein, in a sixth example, the apparatus may comprise a registry of firmware version information of the target device, wherein the program further compares the firmware version information with the firmware update.

Further to the sixth example or any other example discussed herein, in a seventh example, the program ensures that there is permission to replace the firmware with the firmware update.

Further to the seventh example or any other example discussed herein, in an eighth example, the program dispatches an alert in response to a failure to replace the firmware with the firmware update.

Further to the eighth example or any other example discussed herein, in a ninth example, the alert is an audible or visible alert directed to a field service engineer installing the field-replaceable resource.

Further to the eighth example or any other example discussed herein, in a tenth example, the alert is a digital alert directed to an upstream device.

Further, a method of performing field firmware updates 200 may be implemented, in an eleventh example, as a method comprising detecting a replacement of a first resource with a second resource coupled to a target device, the target device comprising firmware, wherein the detection occurs automatically once a field-replaceable unit comprising the second resource is coupled to the target device, and initiating an update of the target device to replace the firmware with a new firmware.

Further to the eleventh example or any other example discussed herein, in a twelfth example, the method further comprises retrieving, by a program executed by a microcontroller of the field-replaceable unit, the new firmware, wherein the new firmware is disposed on a storage device of the field-replaceable unit, storing the firmware of the target device on the storage device, and comparing the new firmware to the firmware.

Further to the twelfth example or any other example discussed herein, in a thirteenth example, the method further comprises replacing the firmware in the target device with the new firmware and replacing the new firmware with the stored firmware in response to a failure of the new firmware.

Further to the thirteenth example or any other example discussed herein, in a fourteenth example, replacing the firmware of the target device with the new firmware further comprising changing software or firmware of the target device or of a component of the target device, initializing the target device or a component of the target device with configuration settings and software, changing software or firmware on the target device or a component of the target device to fix bugs or provide new functionality, re-installing software or firmware in response to the target device not working or in response to a component of the target device not working, changing firmware or software of the target device or a component of the target device to support a new hardware component, or replacing original factory-installed software or firmware.

Further to the eleventh example or any other example discussed herein, in a fifteenth example, the method further comprises verifying the resource to be replaced by confirming a universally unique identifier of the resource, and verifying that the resource satisfies one or more predefined conditions.

Further to the eleventh example or any other example discussed herein, in a sixteenth example, the method further comprises authenticating the resource to be replaced by performing a key or token verification of the resource, wherein an alert is dispatched to a field-service engineer who installed the field-replaceable unit or to a device disposed upstream of the target device.

Further to the eleventh example or any other example discussed herein, in a seventeenth example, the method further comprises dispatching an alert following a failure to replace the firmware in the target device with the new firmware.

The method of performing field firmware updates 200 may also be implemented, in an eighteenth example, in a non-transitory machine-readable medium having instructions stored therein that, in response to being executed on a computing device, cause the computing device to evaluate whether a firmware update in a target device is to be made following replacement of a resource coupled to the target device, wherein the evaluation comprises verifying and authenticating a new resource to replace the resource.

Further to the eighteenth example or any other example discussed herein, in a nineteenth example, the non-transitory machine-readable medium further causes the computing device to confirm that change firmware of the target device or of a component of the target device, initialize the target device or a component of the target device with configuration settings and software, change software on the target device or a component of the target device to fix bugs or provide new functionality, re-install software or firmware in response to the target device not working or in response to a component of the target device not working, change firmware or software of the target device or a component of the target device to support a new hardware component, or change initial factory-installed software or firmware of the target device.

Further to the nineteenth example or any other example discussed herein, in a twentieth example, the non-transitory machine-readable medium further causes the computing device to confirm the permission by reading a jumper on the target device.

The method of performing field firmware updates 200 may also be implemented, in a twenty-first example, in a non-transitory machine-readable medium having instructions stored therein that, in response to being executed on a computing device, cause the computing device to realize an apparatus as in any preceding example.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

We claim:

1. A replaceable hardware apparatus adapted to be coupled to a target device, the replaceable hardware apparatus comprising:
   a hardware resource configured to be physically coupled to the target device, wherein the target device includes a memory device to store instructions that provide firmware instructions or software instructions for operation of the target device;
   a storage device configured to store update data for deployment to the target device;
   circuitry configured to host a trusted execution environment; and a microcontroller comprising embedded memory to execute microcontroller instructions, wherein execution of the microcontroller instructions cause the microcontroller to:
  detect coupling of the hardware resource to the target device;
  boot the trusted execution environment;
  cause the trusted execution environment to compute a hash on at least a portion of code stored on the replaceable hardware apparatus in the trusted execution environment to ensure integrity of the at least a portion of the code of the replaceable hardware apparatus before a change is made to the target device;
  control interaction between the replaceable hardware apparatus and the target device;
  perform attestation of attributes of the replaceable hardware apparatus to the target device, using the trusted execution environment; and
  cause an update of at least one of: data, software instructions, or firmware instructions of the target device, using the update data obtained from the storage device, based on the attestation of the attributes of the replaceable hardware apparatus using the trusted execution environment.

2. The replaceable hardware apparatus of claim 1, wherein the update of the software instructions or the firmware instructions of the target device causes one or more of:
  upgrading of a current version of the firmware instructions of the target device;
  upgrading of a current version of the firmware instructions of a hardware component of the target device;
  downgrading of the current version of the firmware instructions of the target device;
  downgrading of the current version of the firmware instructions of the hardware component of the target device;
  initializing an execution environment of the target device with configuration settings and software;
  initializing a hardware component of the target device with configuration settings and software;
  upgrading the software instructions on the target device to fix bugs or provide new functionality;
  upgrading the software instructions on the hardware component of the target device to fix bugs or provide new functionality;
  re-installing software instructions or firmware instructions on the target device;
  re-installing software instructions or firmware instructions on a hardware component of the target device;
  upgrading software instructions or firmware instructions of the target device to support a new hardware component; and
  upgrading software instructions or firmware instructions of the hardware component of the target device to support the new hardware component.

3. The replaceable hardware apparatus of claim 1, wherein the trusted execution environment is configured to isolate execution of the microcontroller instructions.

4. The replaceable hardware apparatus of claim 1, wherein the execution of the microcontroller instructions further cause the microcontroller to:
  save a current version of the data, the software instructions, or the firmware instructions of the target device; and
  revert to the current version of the data, the software instructions, or the firmware instructions in response to a failure to replace the current version with the update data.

5. The replaceable hardware apparatus of claim 1, wherein the storage device is further configured to store data providing a registry of version information of the target device, and wherein the execution of the microcontroller instructions further cause the microcontroller to compare the version information with version information associated with the update data.

6. The replaceable hardware apparatus of claim 5, wherein the execution of the microcontroller instructions further cause the microcontroller to verify permission to replace the data, the software instructions, or the firmware instructions with the update data.

7. The replaceable hardware apparatus of claim 6, wherein the execution of the microcontroller instructions further cause the microcontroller to provide an alert in response to a failure to replace the data, the software instructions, or the firmware instructions with the update data.

8. The replaceable hardware apparatus of claim 1, wherein the update of the data, the software instructions, or the firmware instructions is initiated by the target device, in response to the target device detecting the coupling of the replaceable hardware apparatus to the target device.

9. The replaceable hardware apparatus of claim 1, wherein the replaceable hardware apparatus is a battery device, a capacitor device, an automotive component, or a drone component.

10. The replaceable hardware apparatus of claim 1, wherein the at least a portion of code stored on the replaceable hardware apparatus includes the firmware instructions or the software instructions.

11. A non-transitory machine-readable medium having instructions stored therein that, when executed by circuitry of a replaceable hardware apparatus, cause the replaceable hardware apparatus to:
  detect coupling of a hardware resource of the replaceable hardware apparatus to a target device;
  boot a trusted execution environment;
  cause the trusted execution environment to compute a hash on at least a portion of code stored on the replaceable hardware apparatus in the trusted execution environment to ensure integrity of the at least a portion of code stored on the replaceable hardware apparatus before a change is made to the target device;
  control interaction between the replaceable hardware apparatus and the target device;
  obtain update data for deployment to the target device;
  perform attestation of attributes of the replaceable hardware apparatus to the target device, using the trusted execution environment of the replaceable hardware apparatus; and
  control an update of at least one of: data, software instructions, or firmware instructions of the target device, using the update data, the update data configured for deployment on the target device based on the attestation of the attributes of the replaceable hardware apparatus using the trusted execution environment.

12. The non-transitory machine-readable medium of claim 11, wherein the update of the software instructions or firmware instructions of the target device causes one or more of:
  upgrading of a current version of the firmware instructions of the target device;

upgrading of a current version of the firmware instructions of a hardware component of the target device;
downgrading of the current version of the firmware instructions of the target device;
downgrading of the current version of the firmware instructions of the hardware component of the target device;
initializing an execution environment of the target device with configuration settings and software;
initializing a hardware component of the target device with configuration settings and software;
upgrading the software instructions on the target device to fix bugs or provide new functionality;
upgrading the software instructions on the hardware component of the target device to fix bugs or provide new functionality;
re-installing software instructions or firmware instructions on the target device;
re-installing software instructions or firmware instructions on a hardware component of the target device;
upgrading software instructions or firmware instructions of the target device to support a new hardware component; and
upgrading software instructions or firmware instructions of the hardware component of the target device to support the new hardware component.

13. The non-transitory machine-readable medium of claim 11, wherein the trusted execution environment is configured to isolate execution of the instructions.

14. The non-transitory machine-readable medium of claim 11, wherein the instructions further cause the circuitry to:
save a current version of the data, the software instructions, or the firmware instructions of the target device; and
revert to the current version of the data, the software instructions, or the firmware instructions in response to a failure to replace the current version with the update data.

15. The non-transitory machine-readable medium of claim 11, wherein the replaceable hardware apparatus is further configured to store data providing a registry of version information of the target device, and wherein the instructions further cause the circuitry to compare the version information with version information associated with the update data.

16. The non-transitory machine-readable medium of claim 15, wherein the instructions further cause the circuitry to verify permission to replace the data, the software instructions, or the firmware instructions with the update data.

17. The non-transitory machine-readable medium of claim 16, wherein the instructions further cause the circuitry to provide an alert in response to a failure to replace the data, the software instructions, or the firmware instructions with the update data.

18. The non-transitory machine-readable medium of claim 11, wherein the update of the data, the software instructions, or the firmware instructions is initiated by the target device, in response to the target device detecting the coupling of the replaceable hardware apparatus to the target device.

19. The non-transitory machine-readable medium of claim 11, wherein the replaceable hardware apparatus is a battery device, a capacitor device, an automotive component, or a drone component.

20. The non-transitory machine readable medium of claim 11, wherein the at least a portion of code stored on the replaceable hardware apparatus includes the firmware instructions or the software instructions.

21. A replaceable hardware resource apparatus, comprising:
means for detecting a coupling of the replaceable hardware resource apparatus to a target device;
means for booting a trusted execution environment and causing the trusted execution environment to compute a hash on at least a portion of code stored on the replaceable hardware resource apparatus in the trusted execution environment to ensure integrity of the at least a portion of code stored on the replaceable hardware resource apparatus before a change is made to the target device;
communication means for controlling communications between the replaceable hardware resource apparatus and the target device;
attestation means for performing attestation of attributes of the replaceable hardware resource apparatus to the target device, using the trusted execution environment; and
update means for causing installation of at least one of: data, software instructions, or firmware instructions onto the target device, based on deployment of the installation on the target device and the attestation of the attributes of the replaceable hardware resource apparatus using the trusted execution environment.

22. The replaceable hardware resource apparatus of claim 21, wherein the replaceable hardware resource apparatus is a battery device, a capacitor device, an automotive component, or a drone component.

23. The replaceable hardware apparatus of claim 21, wherein the at least a portion of code stored on the replaceable hardware apparatus includes the firmware instructions or the software instructions.

* * * * *